Nov. 19, 1929.   J. N. LINT ET AL   1,736,085
DEVICE FOR REFACING BRAKE DRUMS, ETC
Filed Sept. 27, 1927   2 Sheets-Sheet 1

Inventors
J. N. Lint
R. M. Cook
By C A Snow & Co.
Attorneys

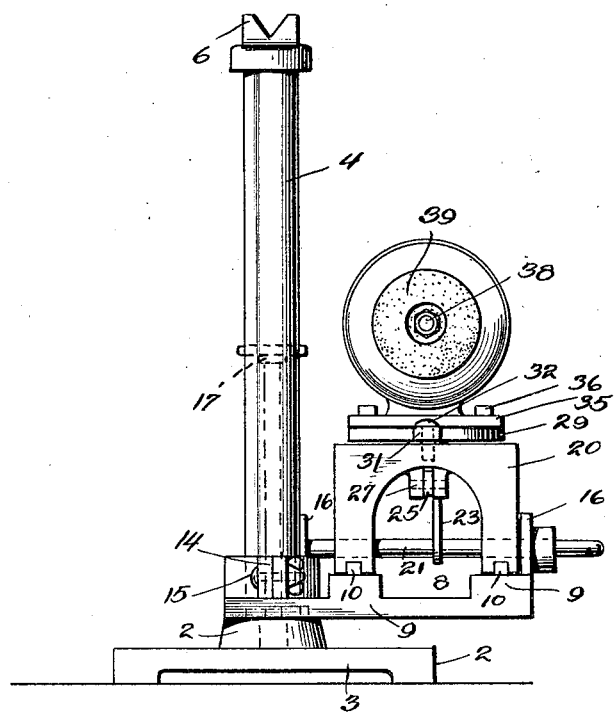
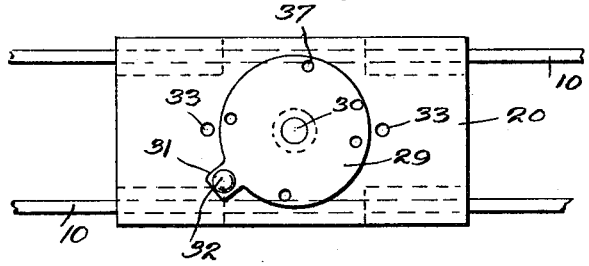

Patented Nov. 19, 1929

1,736,085

UNITED STATES PATENT OFFICE

JOHN N. LINT AND ROY M. COOK, OF MEYERSDALE, PENNSYLVANIA

DEVICE FOR REFACING BRAKE DRUMS, ETC.

Application filed September 27, 1927.  Serial No. 222,340.

This invention aims to provide a simple means whereby a brake drum on an automobile may be ground without taking the brake drum off the vehicle, it being possible to grind the brake drum smoothly and evenly across its entire surface and about its entire circumference.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 3 is an end elevation;

Figure 4 is a fragmental detail view showing the carriage and attendant parts.

Figure 1:
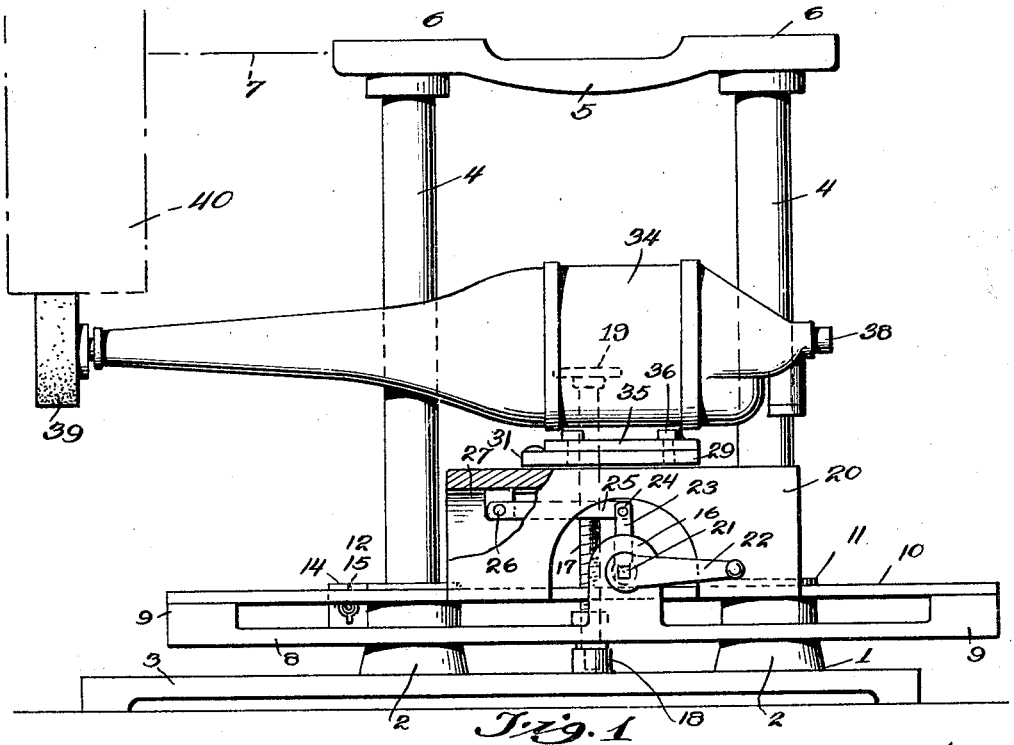
Figure 1 shows in side elevation, a device constructed in accordance with the invention, parts being broken away.
Figure 2:
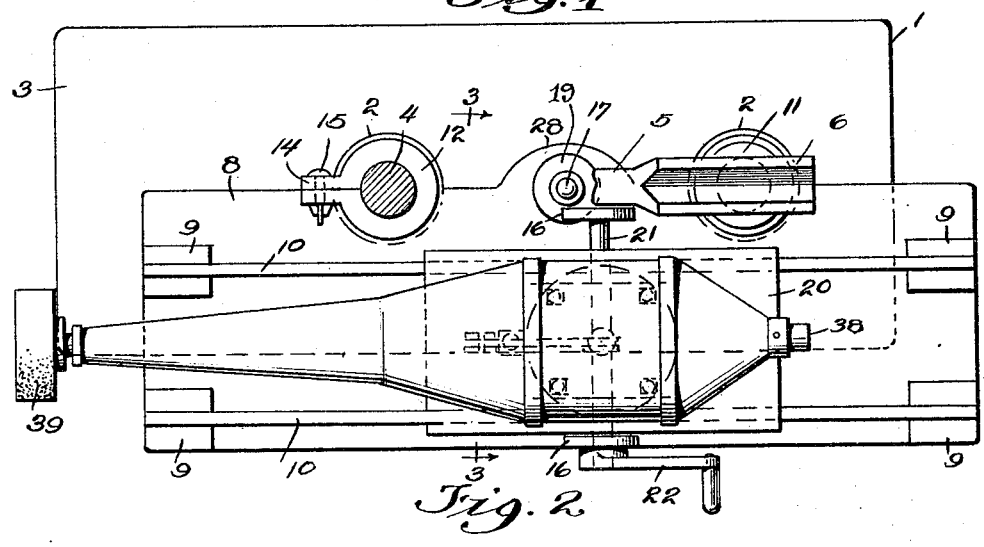
Figure 2 is a top plan wherein parts are broken away.

The device forming the subject matter of this application includes a frame 1, made up of a base plate 3 having bosses 2 in which the lower ends of parallel vertical standards 4 are mounted, a cross bar 5 connecting the upper ends of the standards 4, and the cross bar being equipped at its ends with saddles 6 in which a vehicle axle 7 may be mounted, the axle being indicated diagrammatically in Figure 1 of the drawings.

The numeral 8 marks a vertically movable table provided with bosses 9 on which parallel tracks 10 are carried. The table 8 is supplied on one edge with guides 11 and 12 receiving the standards 4, the table thus being mounted on the standards for vertical adjustment. One of the guides, to wit, the guide 12, is split and compressible, said guide including arms 14 connected by a tightening means 15 which may be a bolt and a nut. There are oppositely disposed bearings 16 on the table 8. The numeral 17 designates a lifting device, preferably a screw held at its lower end for rotation, but against endwise movement, in a bearing 18 on the base plate 3. The lifting screw 17 is threaded into the table 8, the table being provided upon one edge with a lateral extension 28 which gives ample room for the threading of the lifting screw 17 into the table 8. The screw 17 has a hand wheel 19 whereby the screw can be rotated readily.

A carriage 20 is mounted for horizontal reciprocation on the tracks 10. A shaft 21 is journaled for rotation in the bearing 16 on the table 8. Any suitable means may be provided for rotating the shaft 21. For instance, the shaft 21 may be supplied at one end with a crank 22. Intermediate its ends, the shaft 21 is provided with an arm 23 which is pivoted at 24 to one end of a link 25, the opposite end of the link being pivoted at 26 to depending ears 27 on the underside of the top portion of the carriage 20.

The numeral 29 marks a turn table having a center pin 30 that is journaled in the carriage 20. The turn table 29 has an extension 31 in which slides a locking bolt 32 adapted to be received in either of a pair of oppositely disposed openings 33 fashioned in the carriage 20. The numeral 34 designates an electric motor, the base 35 of which is bolted at 36 in holes 37 in the turn table 29. The shaft 38 of the motor 34 carries a dressing tool, for instance, a grinding element 39, such as a wheel, the wheel being adapted to move across the brake drum 40 that is carried by the axle 7, the brake drum being designated diagrammatically in Figure 1 of the drawings.

In practical operation, the automobile is jacked up, and the axle housing is mounted in the saddles 6. By means of the hand wheel 19, the lifting screw 17 is rotated, and the carriage 20 is raised or lowered until the grinding wheel 39 cooperates properly with the surface of the brake drum 40 which is to be ground. By means of the crank 22, the shaft 21, the arm 23, and the link 25, the carriage 20 may be moved lengthwise of the tracks 10, the motor 34 being moved accordingly, so that the grinding wheel 39 can be shifted back and forth across the surface of the drum 40 whilst the grinding wheel 39 is being rotated by means of the motor 34.

In order to bring the grinding wheel 39 into contact with all parts of the brake drum 40, the brake drum may be turned, by hand, if desired, or in some cases, the power may be applied to the brake drum from the engine of the vehicle, to rotate the brake drum.

By removing the locking bolt 32 from one of the holes 33, the turn table 29 may be rotated, thereby to turn the motor 34 end for end, the grinding wheel 39 being shifted from the position shown in Figure 1, so that the grinding wheel can operate on the brake drum at the opposite side of the vehicle from that shown in Figure 1 of the drawings. After the table 8 has been elevated to the desired amount by means of the screw 17, the bolt 15 may be tightened up to cause the guide 12 to grip the corresponding standard 4, the working parts of the machine thus being supported without throwing too much weight on the lifting screw 17. The shaft 21 and attendant parts constitute means whereby the grinding wheel 39 is fed back and forth across the face of the drum 40, and the screw 17 constitutes a means whereby the amount that the wheel 39 cuts into the drum 40, vertically, may be regulated.

What is claimed is:—

In a device for refacing brake drums on an automobile, a frame including a base, standards mounted on the base, a table slidable on the standards for vertical adjustment, a straight track on the table, a saddle connecting the upper ends of the standards and reinforcing them, the saddle having means for receiving the axle of an automobile, and said means being parallel to the track, a carriage movable along the track, a shaft and a dressing tool on the shaft, mechanism for mounting the shaft on the carriage for end-for-end reversal, whereby the dressing tool may be used to dress a drum at either end of a vehicle axle whilst the axle is supported on said means, mechanism for holding the shaft and the dressing tool with their axis of rotation parallel to said means, mechanism for raising and lowering the table to bring the periphery of the dressing tool against the periphery of the drum to be dressed, and mechanism for moving the carriage along the track to shift the dressing tool across the periphery of the drum to be dressed.

In testimony that we claim the foregoing as our own, we have hereto affixed our signatures.

JOHN N. LINT.
ROY M. COOK.